(12) United States Patent
Ye (10) Patent No.: US 10,205,510 B2
(45) Date of Patent: Feb. 12, 2019

(54) MULTI-INPUT AND MULTI-OUTPUT (MIMO) SYSTEM AND METHOD FOR PROVIDING SATELLITE SERVICE

(71) Applicant: Pacific Telecom & Navigation Limited, Wanchai (HK)

(72) Inventor: Lei Ye, Wanchai (HK)

(73) Assignee: PACIFIC TELECOM & NAVIGATION LIMITED, Wanchai (HK)

( * ) Notice: Subject to any disclaimer, the term of this patent is extended or adjusted under 35 U.S.C. 154(b) by 12 days.

(21) Appl. No.: 15/520,175

(22) PCT Filed: Dec. 17, 2015

(86) PCT No.: PCT/CN2015/097717
§ 371 (c)(1),
(2) Date: Apr. 19, 2017

(87) PCT Pub. No.: WO2017/096636
PCT Pub. Date: Jun. 15, 2017

(65) Prior Publication Data
US 2017/0359117 A1 Dec. 14, 2017

(30) Foreign Application Priority Data
Dec. 11, 2015 (CN) .......................... 2015 1 09203472

(51) Int. Cl.
*H04W 76/10* (2018.01)
*H04B 7/0413* (2017.01)
(Continued)

(52) U.S. Cl.
CPC ....... *H04B 7/18513* (2013.01); *H04B 7/0413* (2013.01); *H04B 10/118* (2013.01); *H04W 76/10* (2018.02)

(58) Field of Classification Search
CPC .. H04B 7/18513; H04B 7/0413; H04B 76/02; H04B 10/118; H04B 76/10
(Continued)

(56) References Cited

U.S. PATENT DOCUMENTS

| 6,138,010 A | 10/2000 | Rabe et al. |
| 2008/0247351 A1* | 10/2008 | Dankberg .......... H04B 7/18534 370/316 |

(Continued)

FOREIGN PATENT DOCUMENTS

| CN | 1199996 A | 11/1998 |
| CN | 103997365 A | 8/2014 |
| WO | WO 02/091631 A1 | 11/2002 |

*Primary Examiner* — Phong La
(74) *Attorney, Agent, or Firm* — Muncy, Geissler, Olds & Lowe, P.C.

(57) ABSTRACT

The present invention discloses an MIMO satellite service system and a method for providing an MIMO satellite service. According to the present invention, by periodically reporting terminal status information to a gateway platform, and acquiring connectable satellite communication systems of all MIMO satellite service terminals from a broadcast message, all MIMO satellite service terminals that access a network can update, in real time, types of satellite communication systems that can be connected by other terminals in the network. Therefore, not only a same satellite communication system can be selected to perform communication, but also communication across satellite communication systems can be performed based on forwarding of the gateway platform. Therefore, flexibility of satellite communication is improved, and interconnection and intercommunication are implemented for users that use different satellite communication systems, thereby improving application convenience of users that access a network, and also improving a bandwidth utilization rate of a communication system.

10 Claims, 6 Drawing Sheets

(51) Int. Cl.
*H04B 10/118* (2013.01)
*H04B 7/185* (2006.01)

(58) Field of Classification Search
USPC .......................................... 370/316
See application file for complete search history.

(56) References Cited

U.S. PATENT DOCUMENTS

| | | | | |
|---|---|---|---|---|
| 2009/0133091 | A1* | 5/2009 | Rofougaran | H04B 1/3805 725/133 |
| 2009/0227280 | A1* | 9/2009 | Raab | H04M 1/72536 455/550.1 |
| 2014/0045541 | A1* | 2/2014 | Moshfeghi | H04W 84/00 455/500 |
| 2016/0014786 | A1* | 1/2016 | Chang | H04B 7/2041 370/316 |

* cited by examiner

MULTI-INPUT AND MULTI-OUTPUT (MIMO) SYSTEM AND METHOD FOR PROVIDING SATELLITE SERVICE

TECHNICAL FIELD

The present invention relates to the field of satellite communication and navigation, and in particular, to a Multi-Input and Multi-Output (MIMO) satellite product, solution and service system and the method for providing an MIMO satellite service.

BACKGROUND ART

A conventional satellite communication system is provided with a ground gateway station, aiming to connect satellite signals of the satellite communication system to a ground network, for example, connecting a satellite call to a ground wired telephone network, or connecting satellite broadband data to a ground fiber optic network to complete interpretation and conversion of the satellite communication system signaling protocol and exchange with information of the ground network. However, the existing satellite communication system cannot implement interconnection and intercommunication among a plurality of different satellite communication systems.

SUMMARY OF THE INVENTION

In view of the above, the present invention provides a MIMO satellite service system and a method for providing a MIMO satellite service, to implement interconnection and intercommunication between a plurality of different satellite communication systems and a ground mobile communication system, and integrate a plurality of existing satellite communication system resources to provide more perfect satellite services.

In the first place, a MIMO satellite service system comprises a plurality of MIMO satellite service terminals, a plurality of different satellite communication systems, and a gateway platform;
wherein the MIMO satellite service terminal is adapted to connect the plurality of different satellite communication systems and periodically report terminal status information to the gateway platform by using a satellite communication system having an optimal link status, wherein the terminal status information comprises a set of connectable systems of the present terminal, and the set of connectable systems is a set of satellite communication systems with link statuses satisfying transmitting and receiving requirements;
the gateway platform is adapted to connect the plurality of different satellite communication systems for receiving the terminal status information reported by the plurality of MIMO satellite service terminals to generate a broadcast message comprising the terminal status information of all the MIMO satellite service terminals, and send in a broadcast way the broadcast message by using all the satellite communication systems;
the MIMO satellite service terminal is further configured to receive the broadcast message and acquire the set of connectable systems of all the MIMO satellite service terminals, and initiate communication according to the set of connectable systems of the present terminal and the set of connectable systems of a destination terminal.

Preferably, the MIMO satellite service terminal is configured to acquire a transmission message and a transmission address, and acquire the set of connectable systems of the corresponding destination terminal according to the transmission address; when the set of connectable systems of the present terminal and the set of connectable systems of the destination terminal have an intersection, a call connection request or a short packet is sent to the destination terminal by using a satellite communication system with an optimal link status in the intersection.

Preferably, the MIMO satellite service terminal is configured to acquire a transmission message and a transmission address, and acquire the set of connectable systems of the corresponding destination terminal according to the transmission address; when the set of connectable systems of the present terminal and the set of connectable systems of the destination terminal do not have an intersection, a call connection request or a short packet with the transmission address is sent to the gateway platform by using the satellite communication system with an optimal link status;
the gateway platform is configured to receive the call connection request or short packet with the transmission address, and forward the call connection request or short packet to the destination terminal according to the transmission address.

Preferably, the system further comprises:
a universal data processing terminal connected to the MIMO satellite service terminal through a wireless communication interface for input and output.

Preferably, the gateway platform is further configured to receive a call connection request or short packet with a transmission address by using the mobile communication system, and forward the call connection request or short packet to the corresponding destination terminal according to the transmission address.

Preferably, the MIMO satellite service system further comprises a plurality of satellite positioning systems;
the MIMO satellite service terminal is further configured to receive satellite signals of the plurality of satellite positioning systems to acquire location information of the present terminal, and upload the location information to the gateway platform by using the satellite communication system with an optimal link status;
the gateway platform is configured to receive and store the location information, and provide a location-based service in response to an instruction of an inquiring terminal.

In a second aspect, a method for providing an MIMO satellite service is provided, comprising: detecting, by an MIMO satellite service terminal, link statuses of a plurality of different satellite communication systems;
periodically reporting, by the MIMO satellite service terminal, terminal status information to a gateway platform by using a satellite communication system having an optimal link status, wherein the terminal status information comprises a set of connectable systems of the present terminal, and the set of connectable systems is a set of satellite communication systems with link statuses satisfying transmitting and receiving requirements;
receiving, by the gateway platform, the terminal status information and generating a broadcast message comprising the terminal status information of all the MIMO satellite service terminals, and sending in a broadcast way the broadcast message through all of the satellite communication systems;
receiving, by the MIMO satellite service terminal, the broadcast packet and acquiring the set of connectable systems of all the satellite service terminals, and initiating, by the MIMO satellite service terminal, communication according to the set of connectable systems of the present terminal and the set of connectable systems of a destination terminal.

Preferably, the initiating, by the MIMO satellite service terminal, communication according to the set of connectable systems of the present terminal and the set of connectable systems of a destination terminal comprises:
acquiring a transmission message and a transmission address;
acquiring the set of connectable systems of the corresponding destination terminal according to the transmission address;
when the set of connectable systems of the present terminal and the set of connectable systems of the destination terminal have an intersection, sending a call connection request or a short packet to the destination terminal by using a satellite communication system with an optimal link status in the intersection; and
when the set of connectable systems of the present terminal and the set of connectable systems of the destination terminal do not have an intersection, forwarding the call connection request or short packet to the destination terminal by using the gateway platform.

Preferably, the forwarding the call connection request or short packet to the destination terminal by using the gateway platform comprises:
sending, by the MIMO satellite service terminal, the call connection request or short packet with the transmission address to the gateway platform by using the satellite communication system with an optimal link status; and
receiving, by the gateway platform, the call connection request or short packet with the transmission address, and forwarding the call connection request or short packet to the destination terminal according to the transmission address.

Preferably, the method further comprises:
receiving, by the MIMO satellite service terminal, satellite signals of the plurality of satellite positioning systems and acquiring location information of the present terminal;
uploading, by the MIMO satellite service terminal, the location information to the gateway platform by using the satellite communication system with an optimal link status;
receiving and storing, by the gateway platform, the location information; and providing, by the gateway platform, a location-based service in response to an instruction of an inquiring terminal.

According to the embodiments of the present invention, by periodically reporting terminal status information to the gateway platform, and acquiring connectable satellite communication systems of all satellite communication and navigation terminals from a broadcast message, all MIMO satellite service terminals that access a network can update, in real time, types of satellite communication systems that can be connected by other terminals in the network. Therefore, not only a same satellite communication system can be selected to perform communication, but also communication across satellite communication systems can be performed based on forwarding of the gateway platform. Therefore, flexibility of satellite communication is improved, and interconnection and intercommunication are implemented for users that use different satellite communication systems, thereby improving application convenience of users that access a network, and also improving a bandwidth utilization rate of a communication system.

BRIEF DESCRIPTION OF THE DRAWINGS

By means of the following description of embodiments of the present invention with reference to the accompanying drawings, the foregoing and other objectives, features, and advantages of the present invention will be more apparent.
In the drawings.

DETAILED DESCRIPTION OF THE INVENTION

The present invention will be described based on the following embodiments, but not limited only to these embodiments. In the following detailed description of the present invention, some specific details are described in detail. A person skilled in the art can thoroughly understand the present invention without the description of the details. To avoid obscuring the essence of the present invention, commonly known methods, processes, flows, elements, and circuits are not described in detail.

In addition, an ordinary skilled person in the art should understand that, the accompanying drawings provided herein are intended for an illustrative purpose, and are not necessarily drawn to scale.

Unless otherwise stated explicitly in the context, a word such as "comprise" or "include" in the entire specification and claims should be explained as inclusive, rather than exclusive or exhaustive; that is, a meaning of "include but not limited to".

In the description of the present invention, it should be understood that terms "first", "second", and the like are only used for the purpose of description, and cannot be understood as indicating or implying the relativity of importance. In addition, in the description of the present invention, unless otherwise stated, "a plurality of" means two or more.

Figure 1:
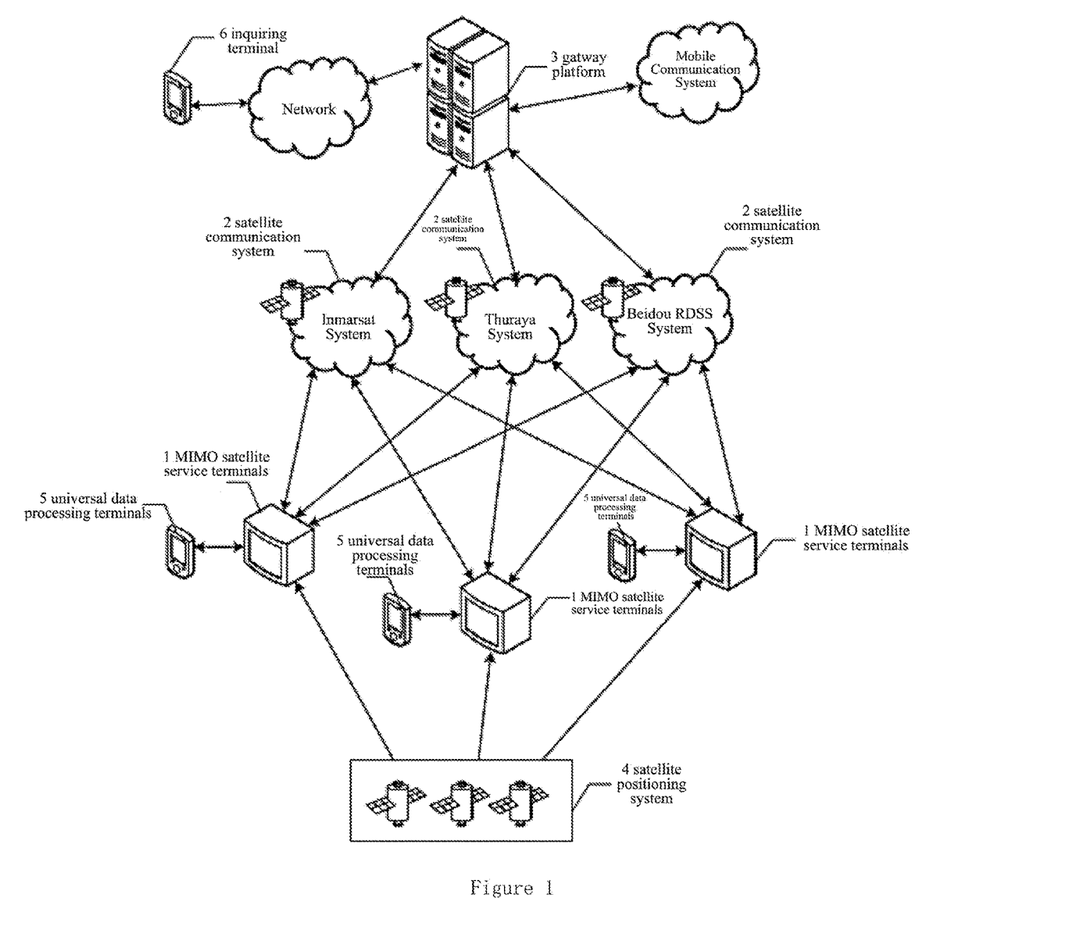
FIG. 1 is a schematic diagram of an MIMO satellite service system according to an embodiment of the present invention.

FIG. 1 is a schematic diagram of an MIMO satellite service system according to an embodiment of the present invention. As shown in FIG. 1, the MIMO (Multi-Input Multi-Output) satellite service system (may also be called a multi-mode satellite service system) comprises a plurality of MIMO satellite service terminals 1 (or called multi-mode satellite service terminals), a plurality of different satellite communication systems 2 (for example, an Inmarsat maritime satellite phone communication system, a Thuraya satellite phone system, and a Beidou RDSS system), a gateway platform 3 connectable to the plurality of different satellite communication systems 2, a plurality of different satellite positioning systems 4, and a universal data processing terminal 5 connectable to the MIMO satellite service terminals 1.

The MIMO satellite service terminals 1 may communicate with each other directly by using the satellite communication systems 2, and may also implement communication across satellite communication systems by forwarding a message based on the gateway platform 3.

In this embodiment, the MIMO satellite service terminal 1 is adapted to connect the plurality of different satellite communication systems 2. In prior art, a carrier NCO (numerically controlled oscillator) with configurable parameters, a spreading code NCO with configurable parameters, and a spreading code generator with configurable parameters can be implemented by using a software radio integrated circuit based on radio frequency high speed analog-to-digital conversion and digital-to-analog conversion technologies. In this way, the MIMO satellite service terminal 1 can receive a plurality of satellite signals at the same time, and if necessary, switch the satellite communication systems to transmit corresponding satellite signals.

The MIMO satellite service terminal 1 is configured to periodically report terminal status information to the gateway platform 3 by using a satellite communication system having an optimal link status. The terminal status information comprises a set of connectable systems of the present terminal, that is, a set of satellite communication systems with link statuses satisfying transmitting and receiving requirements.

At the same time, the gateway platform 3 is used as a ground station, and is adapted to connect the plurality of different satellite communication systems 2, and configured to receive the terminal status information reported by the plurality of MIMO satellite service terminals to generate a broadcast message comprising the terminal status information of all the MIMO satellite service terminals, and send in a broadcast way the broadcast message by using all the satellite communication systems.

The MIMO satellite service terminal 1 is further configured to receive the broadcast message and acquire the set of connectable systems of all the satellite service terminals by parsing the broadcast message, and initiate communication according to the set of connectable systems of the present terminal and the set of connectable systems of a destination terminal.

Figure 2:
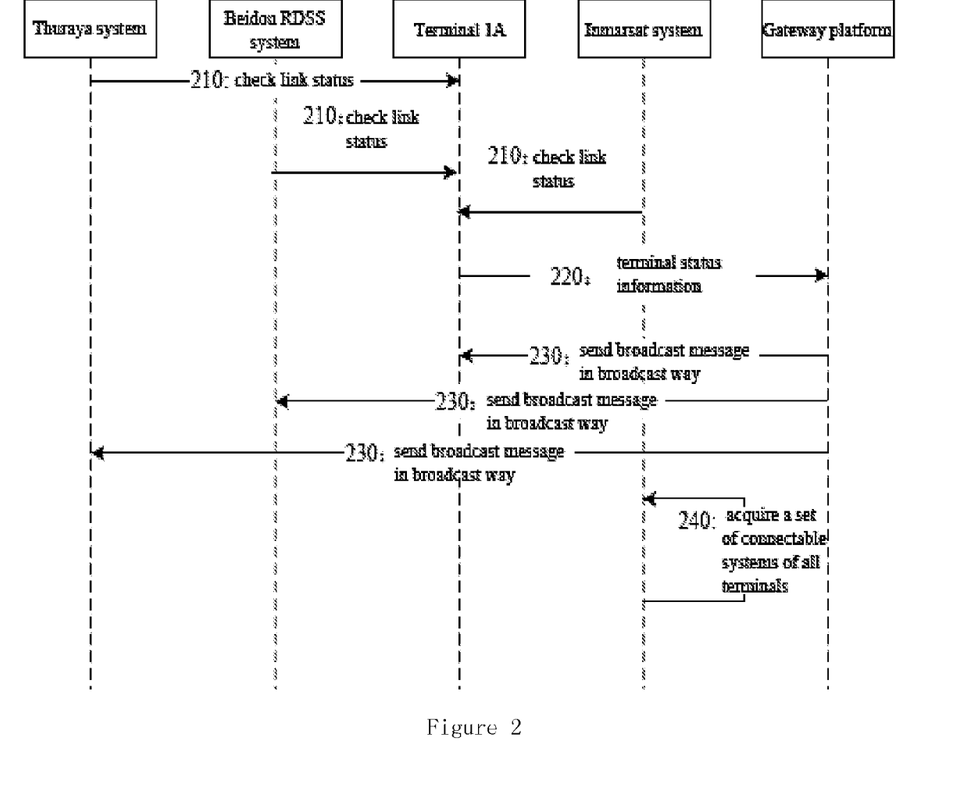
FIG. 2 is a flowchart in which an MIMO satellite service system reports terminal status information and receives a broadcast message according to an embodiment of the present invention.

FIG. 2 is a flowchart in which an MIMO satellite service system reports terminal status information and receives a broadcast message according to an embodiment of the present invention.

As shown in FIG. 2, in step 210, an MIMO satellite service terminal 1 checks link statuses of a plurality of different satellite communication systems to acquire status information.

In step 220, the MIMO satellite service terminal 1 sends terminal status information to a gateway platform 3 by using a satellite communication system 2 selected by the present terminal.

For example, a satellite communication system selected by a terminal 1A as the present terminal is an Inmarsat system, and a satellite communication system selected by a terminal 1B (not shown in figures) as the present terminal is a Beidou RDSS system. Therefore, the terminal 1A and the terminal 1B report terminal status information by using different satellite communication systems respectively.

In step 230, the gateway platform 3 packages all the received terminal status information into a broadcast message, and sends in a broadcasts way the broadcast message by using all the satellite communication systems.

In step 240, the MIMO satellite service terminal 1 receives the broadcast message, and parses the received broadcast message to acquire and store a set of connectable systems of all satellite service terminals.

Therefore, based on the aforementioned terminal status information reporting-broadcasting mechanism, each MIMO satellite service terminal can acquire link statuses of other MIMO satellite service terminals, and therefore, a suitable approach for satellite communication may be selected among a plurality of satellite communication systems.

Specifically, the MIMO satellite service terminal 1 is configured to acquire a transmission message and a transmission address, and acquire a set of connectable systems of a corresponding destination terminal according to the transmission address. Specifically, the MIMO satellite service terminal 1 is wirelessly connected to the universal data processing terminal 5 (for example, via a Bluetooth interface or a wireless local area network interface), and acquires the transmission message and the transmission address by using the universal data processing terminal 5. The destination terminal for communication can be uniquely identified by using the transmission address.

When a set of connectable systems of the present terminal and the set of connectable systems of the destination terminal have an intersection, the MIMO satellite service terminal 1 sends a call connection request or a short packet to the destination terminal by using a satellite communication system 2 with an optimal link status in the intersection.

Figure 3A:
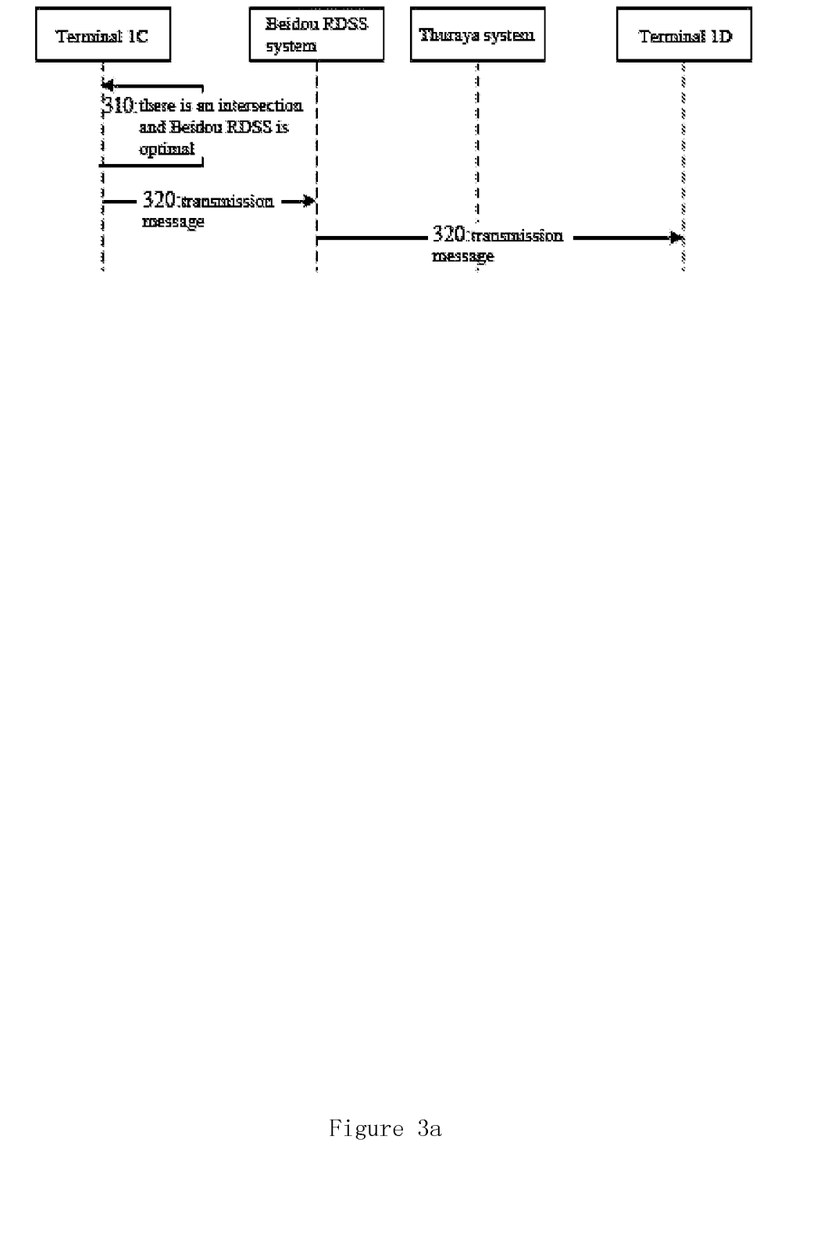
FIG. 3a is a flowchart in which an MIMO satellite service system performs satellite communication according to an embodiment of the present invention.

FIG. 3a is a flowchart in which an MIMO satellite service system performs satellite communication in the foregoing situation according to an embodiment of the present invention. As shown in FIG. 3a, in step 310, a terminal 1C on a transmission side detects that a set of connectable systems of the present terminal and a set of connectable systems of a destination terminal 1D have an intersection.

Therefore, in step 320, the terminal 1C sends the transmission message to the terminal 1D directly by using a satellite communication system with an optimal link status in the intersection (a Beidou RDSS system in FIG. 3a). The transmission message is a call connection request or a short packet. When the set of connectable systems of the present terminal and the set of connectable systems of the destination terminal do not have an intersection, an MIMO satellite service terminal 1 sends the call connection request or short packet with the transmission address to the gateway platform 3 by using the satellite communication system with an optimal link status. At the moment, the gateway platform 3 receives the call connection request or short packet with the transmission address, and forwards the call connection request or short packet to the destination terminal according to the transmission address. In this way, by means of transfer or forward by the gateway platform 3, a call connection is established, or a short packet is received and sent between two MIMO satellite service terminals 1 of which the set of connectable systems do not have an intersection.

Figure 3B:
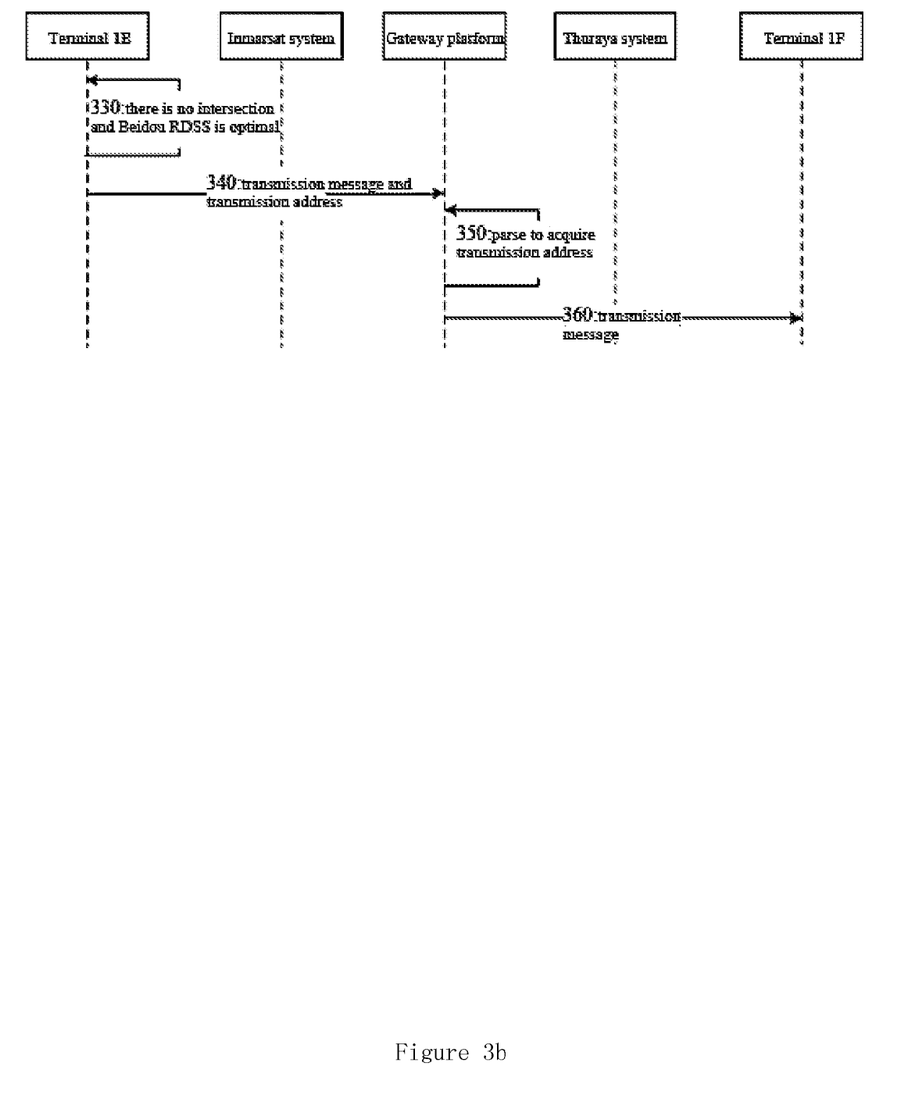
FIG. 3b is a flowchart in which an MIMO satellite service system performs satellite communication according to an embodiment of the present invention.

FIG. 3b is a flowchart in which an MIMO satellite service system performs satellite communication in the foregoing situation according to an embodiment of the present invention. As shown in FIG. 3b, in step 330, after a terminal 1E receives an instruction for communicating with a terminal 1F, it can be found according to known terminal status information that there is no connectable satellite communication system between the terminal 1E and the terminal 1F. In this case, in step 340, the terminal 1E sends a satellite signal to the gateway platform 3 by using a Beidou RDSS system with current optimal link quality, wherein the satellite signal includes a message to be sent to the terminal 1F and the address of the terminal 1F (that is, a transmission address). In step 350, after receiving the satellite signal, the gateway platform 3 parses to acquire the address of the terminal 1F. Because the gateway platform 3 stores terminal status information of all terminals, in step 360, the gateway platform 3 may convert a transmission message into a signal of Thuraya system that can be received by the terminal 1F, and send same to the terminal 1F.

At the same time, the MIMO satellite service system in this embodiment may also perform communication across a mobile communication system and a satellite communication system. The gateway platform 3 is further configured to receive a call connection request or short packet with a transmission address by using the mobile communication system, and forward the call connection request or short packet to the corresponding destination terminal according to the transmission address.

Figure 3C:
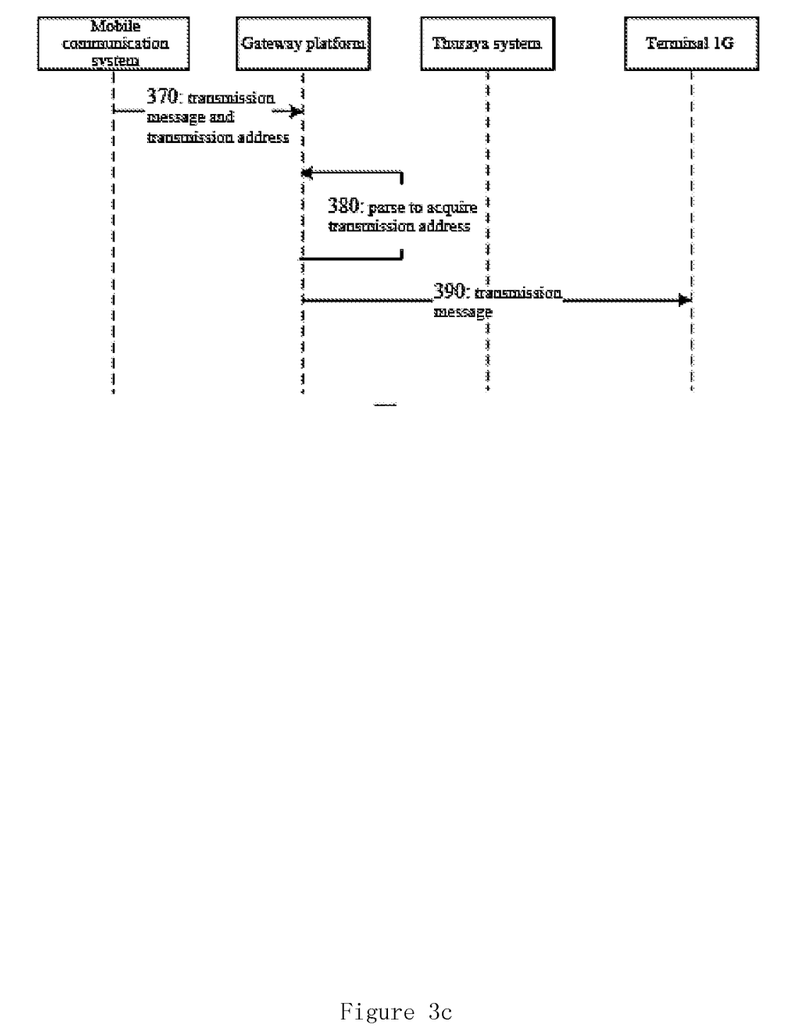
FIG. 3c is a flowchart in which an MIMO satellite service system performs satellite communication according to an embodiment of the present invention.

FIG. 3c is a flowchart in which an MIMO satellite service system performs satellite communication in the foregoing situation according to an embodiment of the present invention. As shown in FIG. 3c, in step 370, a gateway platform 3 receives a call connection request or short packet with a transmission address by using a mobile communication system. The call connection request or short packet may be directly sent by a mobile communication terminal, or may be sent by an MIMO satellite communication terminal provided with a mobile communication module. In step 380, after receiving the satellite signal, the gateway platform 3 parses to acquire an address of a terminal 1G (that is, a transmission address). In step 390, the gateway platform 3 can convert the transmission message into a satellite signal of a Thuraya system that can be received by the terminal 1G to send to the terminal 1G.

In this way, interconnection and intercommunication between a mobile communication system and an MIMO satellite service system of the present invention can be implemented, thereby further enhancing convenience of use to the system.

Similarly, the gateway platform may further receive a call connection request or short packet with a transmission address by using a satellite communication system, and forward the call connection request or short packet to a corresponding mobile communication terminal according to the transmission address.

According to the embodiments of the present invention, by periodically reporting terminal status information to the gateway platform, and acquiring connectable satellite communication systems of all satellite communication and navigation terminals from a broadcast message, all MIMO satellite service terminals that access a network can update, in real time, types of satellite communication systems that can be connected by other terminals in the network. Therefore, not only a same satellite communication system can be selected to perform communication, but also communication across satellite communication system can be performed based on forwarding of the gateway platform. Therefore, flexibility of satellite communication is improved, and interconnection and intercommunication are implemented for users that use different satellite communication systems, thereby improving application convenience of users that access a network, and also improving a bandwidth utilization rate of a communication system.

At the same time, the MIMO satellite service system in this embodiment of the present invention may also be compatible with a plurality of different satellite positioning systems 4 (for example, satellite navigation positioning systems such as GPS, Beidou RNSS, and GALILEO). The MIMO satellite service terminal 1 is further configured to receive satellite signals of the plurality of satellite positioning systems 4 and acquire location information of the present terminal, and upload the location information to the gateway platform 3 by using the satellite communication system 2 with an optimal link status. At the same time, the gateway platform 3 receives and stores the location information, and provides a location-based service in response to an instruction of an inquiring terminal 6. The inquiring terminal 6 may be connected to the gateway platform 3 via a network (the Internet or a dedicated network). For example, the inquiring terminal 6 may acquire current positions of all MIMO satellite service terminals in the network by accessing the gateway platform, to monitor and manage the MIMO satellite service terminals.

At the same time, the MIMO satellite service terminal 1 may also provide positioning and navigation services to a user based on the acquired location information. The location information and navigation information may be sent to the connected universal data processing terminal 5 in a wireless manner to output.

Because signals of a plurality of different satellite positioning systems may be received, and a position of the present terminal is reported to the gateway platform, location information of the MIMO satellite service terminals may be reliably mastered, to enhance reliability of the system, and at the same time, various location-based services may be provided based on location information collected by the gateway platform.

Figure 4:
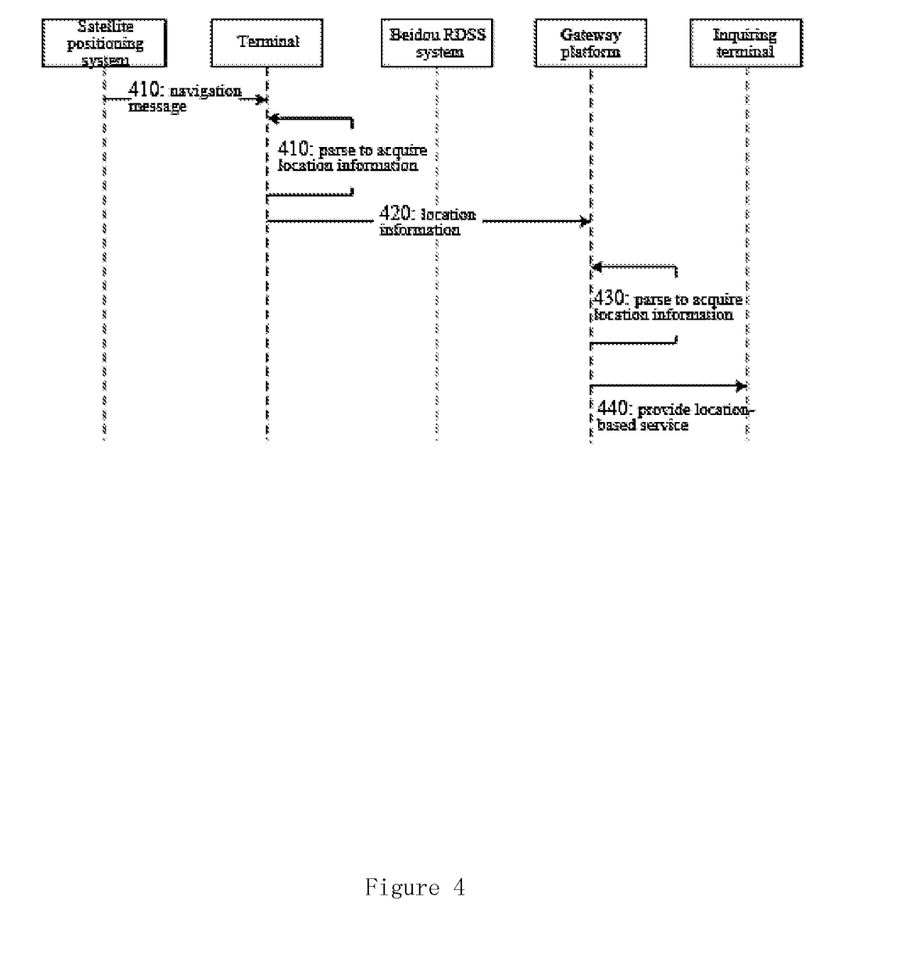
FIG. 4 is a flowchart in which an MIMO satellite service system provides a positioning and navigation service according to an embodiment of the present invention.

FIG. 4 is a flowchart in which an MIMO satellite service system provides a navigation service according to an embodiment of the present invention. As shown in FIG. 4, in step 410, an MIMO satellite service terminal 1 acquires location information by receiving a signal of a satellite positioning system. In step 420, the MIMO satellite service terminal 1 uploads the location information to the gateway platform by using a satellite communication system with an optimal link status (a Beidou RDSS in FIG. 4). In step 430, the gateway platform 3 receives and stores the location information. In step 440, the gateway platform provides a location-based service (LBS) in response to an instruction of an inquiring terminal, for example, a map service or a navigation service.

The foregoing contents are merely preferable embodiments of the present invention, but not intended to limit the present invention. For a person skilled in the art, various modifications and variations may be made to the present invention. Any modification, equivalent alternatives, or improvement can be made without departing from the spirit and principle of the present invention, and fall into the protection scope of the present invention.

The invention claimed is:

1. An MIMO satellite service system, comprising: a plurality of MIMO satellite service terminals, a plurality of different satellite communication systems, and a gateway platform;

wherein the plurality MIMO satellite service terminals is adapted to be connected with the plurality of different satellite communication systems and periodically report terminal status information to the gateway platform by using a satellite communication system having an optimal link status, wherein the terminal status information comprises a set of connectable systems of the present terminal, and wherein the set of connectable systems is a set of satellite communication systems with link statuses satisfying transmitting and receiving requirements;

the gateway platform is adapted to be connected with the plurality of different satellite communication systems, and configured to receive the terminal status information reported by the plurality of MIMO satellite service terminals to generate a broadcast message comprising the terminal status information of all the plurality MIMO satellite service terminals, and send in a broadcast way the broadcast message by using all the satellite communication systems;

the plurality MIMO satellite service terminals is further configured to receive the broadcast message and acquire the set of connectable systems of all the satellite service terminals, and initiate communication according to the set of connectable systems of the present terminal and the set of connectable systems of a destination terminal.

2. The MIMO satellite service system according to claim 1, wherein the plurality MIMO satellite service terminals is configured to acquire a transmission message and a transmission address, and acquire the set of connectable systems of the corresponding destination terminal according to the transmission address; when the set of connectable systems of the present terminal and the set of connectable systems of the destination terminal have an intersection, a call connection request or a short packet is sent to the destination terminal by using a satellite communication system with an optimal link status in the intersection.

3. The MIMO satellite service system according to claim 1, wherein the plurality MIMO satellite service terminals is configured to acquire a transmission message and a transmission address, and acquire the set of connectable systems of the corresponding destination terminal according to the transmission address; when the set of connectable systems of the present terminal and the set of connectable systems of the destination terminal do not have an intersection, a call connection request or a short packet with the transmission address is sent to the gateway platform by using the satellite communication system with an optimal link status;

the gateway platform is configured to receive the call connection request or short packet with the transmission address, and forward the call connection request or short packet to the destination terminal according to the transmission address.

4. The MIMO satellite service system according to claim 1, wherein the system further comprises:

a universal data processing terminal connected to the plurality MIMO satellite service terminals through a wireless communication interface for input and output.

5. The MIMO satellite service system according to claim 1, wherein the gateway platform is further configured to receive a call connection request or short packet with a transmission address by using the mobile communication system, and forward the call connection request or short packet to the corresponding destination terminal according to the transmission address.

6. The MIMO satellite service system according to claim 1, wherein the MIMO satellite service system further comprises a plurality of satellite positioning systems;

the MIMO satellite service terminal is further configured to receive satellite signals of the plurality of satellite positioning systems and acquire location information of the present terminal, and upload the location information to the gateway platform by using the satellite communication system with an optimal link status;

the gateway platform is configured to receive and store the location information, and provide a location-based service in response to an instruction of an inquiring terminal.

7. A method for providing an MIMO satellite service, comprising:

detecting, by an MIMO satellite service terminal, link statuses of a plurality of different satellite communication systems;

periodically reporting, by the MIMO satellite service terminal, terminal status information to a gateway platform by using a satellite communication system having an optimal link status, wherein the terminal status information comprises a set of connectable systems of the present terminal, and the set of connectable systems is a set of satellite communication systems with the link statuses satisfying transmitting and receiving requirements;

receiving, by the gateway platform, the terminal status information and generating a broadcast message comprising the terminal status information of all the MIMO satellite service terminals, and sending in a broadcast way the broadcast message through all of the satellite communication systems;

receiving, by the MIMO satellite service terminal, the broadcast packet and acquiring the set of connectable systems of all the MIMO satellite service terminals, and initiating, by the MIMO satellite service terminal, communication according to the set of connectable systems of the present terminal and the set of connectable systems of a destination terminal.

8. The method for providing an MIMO satellite service according to claim 7, wherein the initiating, by the MIMO satellite service terminal, communication according to the set of connectable systems of the present terminal and the set of connectable systems of a destination terminal comprises:

acquiring a transmission message and a transmission address;

acquiring the set of connectable systems of the corresponding destination terminal according to the transmission address;

when the set of connectable systems of the present terminal and the set of connectable systems of the destination terminal have an intersection, sending a call connection request or a short packet to the destination terminal by using a satellite communication system with an optimal link status in the intersection; and when the set of connectable systems of the present terminal and the set of connectable systems of the destination terminal do not have an intersection, forwarding the call connection request or short packet to the destination terminal by using the gateway platform.

9. The method for providing an MIMO satellite service according to claim 8, wherein the forwarding the call connection request or short packet to the destination terminal by using the gateway platform comprises:

sending, by the MIMO satellite service terminal, the call connection request or short packet with the transmission address to the gateway platform by using the satellite communication system with an optimal link status; and receiving, by the gateway platform, the call connection request or short packet with the transmission address, and forwarding the call connection request or short packet to the destination terminal according to the transmission address.

10. The method for providing an MIMO satellite service according to claim 7, wherein the method further comprises:

receiving, by the MIMO satellite service terminal, satellite signals of a plurality of satellite positioning systems and acquiring location information of the present terminal;

uploading, by the MIMO satellite service terminal, the location information to the gateway platform by using the satellite communication system with an optimal link status;
receiving and storing, by the gateway platform, the location information; and
providing, by the gateway platform, a location-based service in response to an instruction of an inquiring terminal.

* * * * *